(12) United States Patent
Ito et al.

(10) Patent No.: US 8,050,931 B2
(45) Date of Patent: Nov. 1, 2011

(54) SOUND MASKING SYSTEM AND MASKING SOUND GENERATION METHOD

(75) Inventors: Atsuko Ito, Hamamatsu (JP); Yasushi Shimizu, Hamamatsu (JP); Akira Miki, Hamamatsu (JP); Masato Hata, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 888 days.

(21) Appl. No.: 12/051,695

(22) Filed: Mar. 19, 2008

(65) Prior Publication Data

US 2008/0235008 A1    Sep. 25, 2008

(30) Foreign Application Priority Data

Mar. 22, 2007   (JP) ................. 2007-075282

(51) Int. Cl.
  *G10L 21/00*  (2006.01)
  *H04R 3/02*   (2006.01)
(52) U.S. Cl. ...................... 704/278; 381/73.1
(58) Field of Classification Search .............. 704/270, 704/278; 381/73.1
  See application file for complete search history.

(56) References Cited

U.S. PATENT DOCUMENTS

| 4,937,867 | A   |   | 6/1990  | Kasparian et al. |
| 7,143,028 | B2 | * | 11/2006 | Hillis et al. ............... 704/203 |
| 7,363,227 | B2 | * | 4/2008  | Mapes-Riordan et al. ... 704/273 |
| 2006/0109983 | A1 | * | 5/2006 | Young et al. ............... 380/252 |
| 2006/0247919 | A1 |   | 11/2006 | Specht et al. |
| 2008/0120115 | A1 | * | 5/2008 | Mao ....................... 704/278 |
| 2008/0243492 | A1 | * | 10/2008 | Miki et al. ............... 704/205 |

FOREIGN PATENT DOCUMENTS

| WO | WO-2004/010620 | 1/2004 |
| WO | WO-2004/010627 | 1/2004 |

* cited by examiner

*Primary Examiner* — Samuel G Neway
(74) *Attorney, Agent, or Firm* — Morrison & Foerster LLP

(57) ABSTRACT

In a masking sound generation apparatus, a CPU analyzes a speech utterance speed of a received sound signal. Then, the CPU copies the received sound signal into a plurality of sound signals and performs the following processing on each of the sound signals. Namely, the CPU divides each of the sound signals into frames on the basis of a frame length determined on the basis of the speech utterance speed. Reverse process is performed on each of the frames to replace a waveform of the frame with a reverse waveform, and a windowing process is performed to achieve a smooth connection between the frames. Then, the CPU randomly rearranges the order of the frames and mixes the plurality of sound signals to generate a masking sound signal.

12 Claims, 3 Drawing Sheets

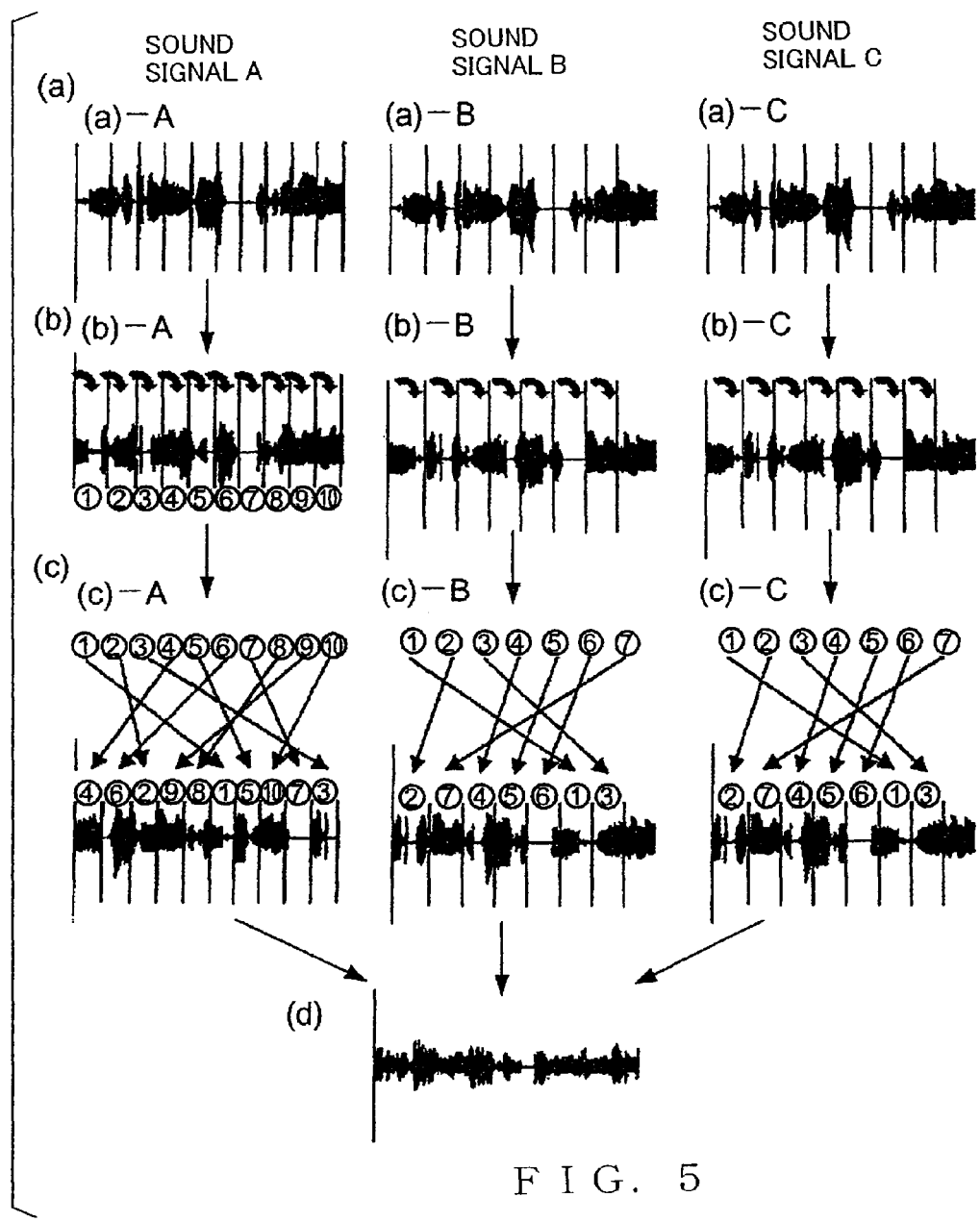
F I G. 5

SOUND MASKING SYSTEM AND MASKING SOUND GENERATION METHOD

BACKGROUND

The present invention relates to techniques for generating masking sounds.

There has been generally known the phenomenon where, when you are hearing certain voices or sounds (target sounds) and if there are other voices or sounds (masking sounds) having acoustic characteristics (e.g., frequency characteristics) close to those of the target sounds, the target sounds become difficult to hear. Such a phenomenon is commonly called "masking effect". The masking effect is based on human auditory or aural characteristics, and it has been known that the masking effect becomes more prominent if the masking sounds are closer in frequency to the target sounds and the masking sounds are higher in sound volume level than the target sounds.

Various acoustic techniques have been proposed, among which are techniques disclosed in Published Japanese Translation of International Patent Application No. 2005-534061 (hereinafter referred to as "Patent Literature 1") which corresponds to International Application Publication No. WO2004/010627. More specifically, Patent Literature 1 discloses a technique which divides a sound signal into a plurality of segments, rearranges or changes the order of the divided segments to convert the sound into a meaningless sound to thereby generate a masking sound.

With the techniques disclosed in Patent Literature 1, the masking effect would sometimes decrease depending on where a sound stream in question is divided (i.e., on divided points of the sound stream). Namely, if the stream can be divided in such a manner as to separate phonemes included in the stream, each sound can be appropriately scrambled, and thus, a sufficiently high masking effect is attainable. However, if the sound stream is divided every predetermined frame length, phonemes may not be separated at suitable points. Further, if the frame length is set short in order to reliably separate phonemes, a generated masking sound would give an unnatural feeling. Therefore, it has heretofore been difficult to set an appropriate frame length for the masking sound generating purpose.

SUMMARY OF THE INVENTION

In view of the foregoing, it is an object of the present invention to provide a technique for generating an effective masking sound on the basis of a picked-up sound signal.

In order to accomplish the above-mentioned object, the present invention provides an improved sound masking system, which comprises: a sound pickup section that picks up a sound and generates an original sound signal corresponding to the picked-up sound; a speech utterance speed signal generation section that generates a speech utterance speed signal, indicative of a speech utterance speed of the picked-up sound, on the basis of the original sound signal generated by the sound pickup section; a table where the speech utterance speed and a frame length for dividing the sound signal into predetermined time lengths are stored in association with each other; a readout section that reads out from the table the frame length corresponding to the speech utterance speed signal generated by the speech utterance speed signal generation section; and a scramble section that copies the original sound signal, generated by the sound pickup section, into sound signals of a plurality of channels, divides the original sound signal of each of the channels into a plurality of frames on the basis of the frame length read out by the readout section, reconfigures the sound signal of each of the channels so as to change a time series of the plurality of frames of the channel and then outputs the reconfigured sound signal of each of the plurality of channels as a scrambled sound signal. With such arrangements, the present invention can generate an effective masking sound on the basis of a picked-up sound signal.

Preferably, the scramble section generates dividing frame lengths corresponding to the plurality of channels, on the basis of the frame length read out by the readout section, such that the divided frames differ in length between the sound signals of the plurality of channels, and the scramble section divides the original sound signal of each of the channels using the generated dividing frame length.

Preferably, the table stores therein frame lengths, corresponding to the individual channels, in association with one speech utterance speed, and the scramble section divides the original sound signal of each of the channels into frames on the basis of the frame length, corresponding to the channel, read out by the readout section.

Preferably, the sound masking system further comprises a processing section that processes the speech utterance signal, generated by the speech utterance speed signal generation section, to generate a plurality of speech utterance speed signals. Here, the readout section reads out from the table frame lengths corresponding to the plurality of speech utterance speed signals generated by the processing section, and the scramble section divides the original sound signal of each of the channels into frames using the frame length, corresponding to the channel, read out by the readout section.

Preferably, the scramble section includes a reverse section that replaces each of the plurality of frames, generated as a result of the original sound signal being divided, with a sound signal generated by reading out sample data of the frame in reverse chronological order.

Preferably, the scramble section further includes a rearrangement section that, for the original sound signal of each of the channels, rearranges the plurality of frames, generated as a result of the original sound signal being divided, into order different from order of the frames in the original sound signal.

According to another aspect of the present invention, there is provided an improved sound masking system, which comprises: a sound pickup section that picks up a sound and generates an original sound signal corresponding to the picked-up sound; a speech utterance speed signal generation section that generates a speech utterance speed signal, indicative of a speech utterance speed of the picked-up sound, on the basis of the original sound signal generated by the sound pickup section; a table where the speech utterance speed and a frame length for dividing the sound signal into predetermined time lengths are stored in association with each other; a readout section that reads out from the table a frame length corresponding to the speech utterance speed signal generated by the speech utterance speed signal generation section; and a scramble section that divides the original sound signal, generated by the sound pickup section, into a plurality of frames on the basis of the frame length read out by the readout section, replaces each of the divided frames with a sound signal generated by reading out sample data of the frame in reverse chronological order, generates a reconfigured sound signal by reconfiguring the replaced frames so as to change a time series of the frames and then outputs the reconfigured sound signal as a scrambled sound signal.

Preferably, the sound masking system further comprises a waveform processing section that processes waveforms of leading and trailing end portions of the plurality of frames divided from the original sound signal.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which:

FIG. 5 is a diagram schematically showing how waveforms of sound signals are varied by the masking sound generation processing.

DETAILED DESCRIPTION

Figure 1:
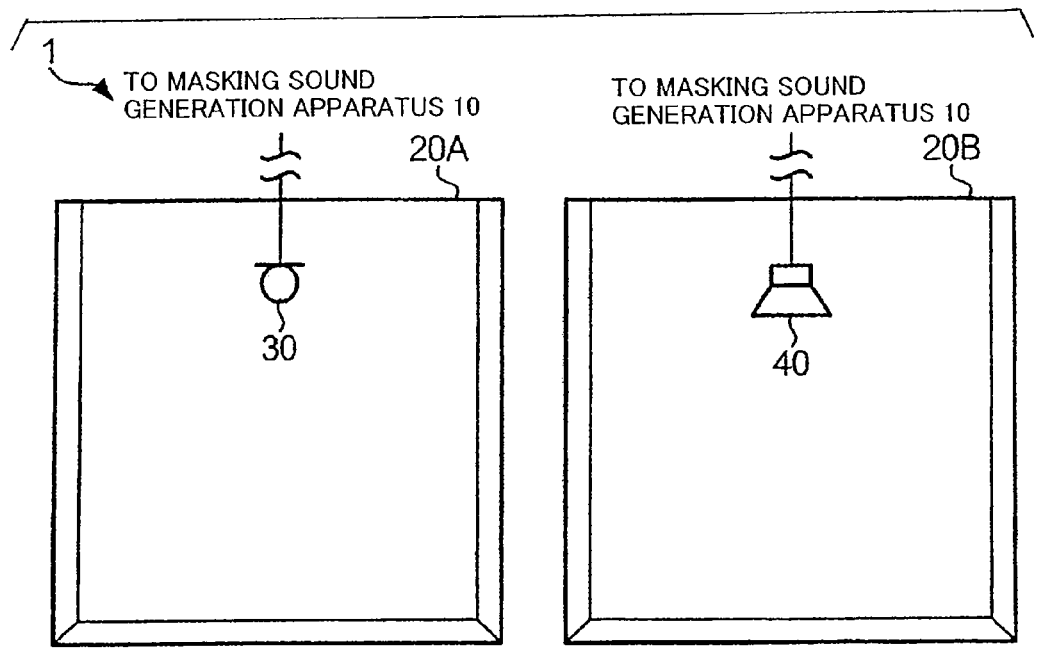
FIG. 1 is a diagram showing a general construction of a sound masking system in accordance with an embodiment of the present invention, which particularly shows acoustic spaces provided with a masking sound generation apparatus.

A. Construction:

A-1. General Construction:

FIG. 1 is a diagram showing a general construction of a sound masking system 1 in accordance with an embodiment of the present invention. As shown in FIG. 1, a microphone 30 is provided in an acoustical space 20A and hung from a ceiling of the space 20A, while a speaker 40 is provided in another acoustical space 20B and hung from a ceiling of the space 20B.

The microphone 30 picks up sounds (i.e., audible sounds, such as human speaking voices and operating sound of an air conditioner) present in the acoustical space 20A, converts the picked-up sounds into analog signals and outputs the analog signals to a masking sound generation apparatus 10. The speaker 40 receives analog sound signals from the masking sound generation apparatus 10 and audibly reproduces or sounds the received analog sound signals in the acoustical space 20B.

Figure 2:
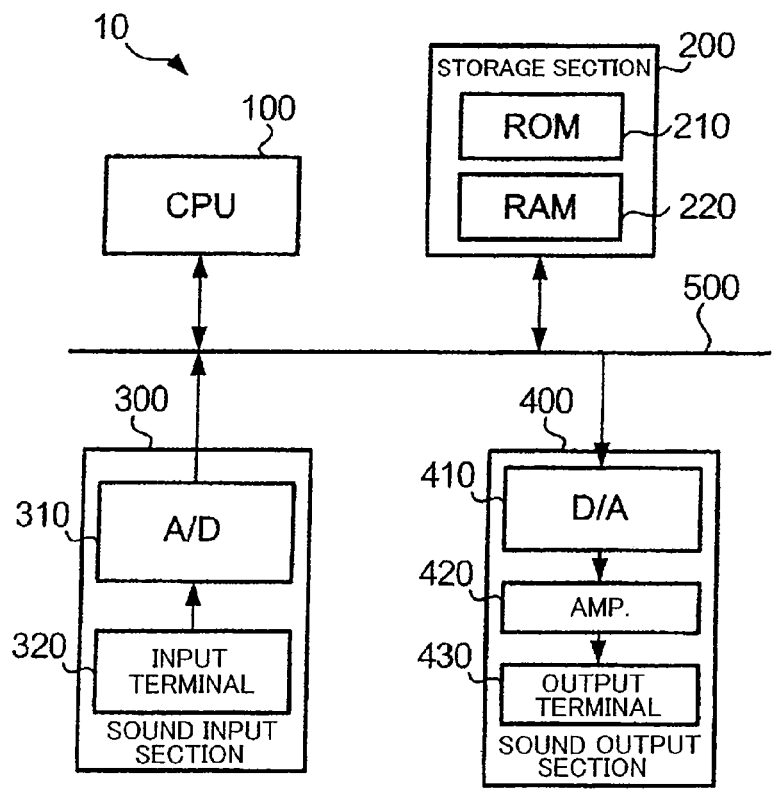
FIG. 2 is a block diagram showing an example construction of the masking sound generation apparatus.

A-2. Construction of Masking Sound Generation Apparatus 10:

Next, a description will be given about an example construction of the masking sound generation apparatus 10, with reference to FIG. 2. The masking sound generation apparatus 10 generates sound signals indicative of masking sounds (also known as "maskers"). The masking sounds are audibly produced in the acoustical space 20B so that a conversation in the acoustical space 20A may be made difficult for each user present in the acoustical space 20B to hear (i.e., security protection by the masking sounds), or so that a conversation of the users present in the acoustical space 20B may not be hindered by sounds overheard or leaked from the acoustical space 20A or the users present in the acoustical space 20B may not be prevented from concentrating on their work (i.e., noise sound masking by the masking sounds).

CPU (Central Processing Unit) 100 executes various programs, stored in a storage section 200, to perform processing that is characteristic of the present invention and control operation of individual sections of the masking sound generation apparatus 10.

Sound input section 300 includes an analog-to-digital (i.e., A/D) converter 310, and an input terminal 320. The microphone 30 is connected to the input terminal 320, so that each sound signal generated by the microphone 30 is input to the A/D converter 310 via the input terminal 320. The A/D converter 310 performs A/D conversion on the sound signal received from the microphone 30 and outputs the resultant digital sound signal to the CPU 100.

Sound output section 400 includes a digital-to-analog (i.e., D/A) converter 410, an amplifier 420, and an output terminal 430. The D/A converter 410 performs D/A conversion on a digital sound signal received from the CPU 100 and outputs the resultant analog sound signal to the amplifier 420. The amplifier 420 adjusts the amplitude (master volume) of the sound signal, received from the D/A converter 410, to an optimal amplitude value, to thereby control the sound signal so as to achieve the greatest masking effect. Amplification factor of the sound signal is controlled by the CPU 100 on the basis of a signal given from an operation section. The output terminal 430 is connected with the speaker 40, so that the sound signal is output from the output terminal 430 to the speaker 40 and thus audibly reproduced or sounded as a masking sound (masker) through the speaker 40 in the acoustical space 20B.

The storage section 200 includes a ROM (Read-Only Memory) 210, and a RAM (Random Access Memory) 220. The ROM 210 has stored therein control programs to cause the CPU 100 to perform functions that are characteristic of the present invention. The RAM 220 includes various storage areas, which are used by the CPU 100 as working areas and which also stores sound signals received from the microphone 30 and various data for generating masking sound signals.

The aforementioned components of the masking sound generation apparatus 10 are interconnected via a bus 500 for communication of data among the components.

The following paragraphs describe the control programs stored in the ROM 210. Note that the CPU 100 executes these control programs to perform various processing, such as processes to be described below.

First, a "speech utterance speed analysis process" is described. In the instant embodiment, the "speech utterance speed" (i.e., speech rate) is a speed or rate at which voices are uttered, and it is defined, for example, as the number of syllables per predetermined time unit. Here, the syllable is a block of a phoneme (e.g., vowel) having a predetermined voice or sound length, or a block of such a phoneme preceded and/or followed by a very short phoneme (e.g., consonant). In the speech utterance speed analysis process, the CPU 100 generates a time-axial waveform per frame of a received sound signal and performs a waveform smoothing operation on envelopes of the time-axial waveforms. Then, from the waveforms having been subjected to the smoothing operation, a waveform peak position of the waveform constituting each of the syllables is detected per frame, to measure the number of the detected peak positions. Then, the number of the detected peak positions is set as the number of the syllables, and the number of the syllables is divided by a frame length to calculate the number of the syllables per unit time. The thus-calculated number of the syllables per unit time is calculated as the speech utterance speed. Here, the "peak" is where the level is greatest in the waveform constituting the corresponding syllable. The speech utterance speed varies with variations over time in the sound signal, and the CPU 100 analyzes and outputs a current speech utterance speed per predetermined time.

Next, a "reverse process" is described. In this reverse process, the CPU 100 first converts each frame of a received (original) sound signal into a time-axial sound signal. Then, the CPU 100 reads out sample data of each of the frames of the received sound signal in a reverse chronological direction along the time axis, to thereby convert each sound signal into a new sound signal. Namely, the reverse process is designed to read out the received sound signal, from the oldest data on, in reverse chronological order which is opposite from the order in which the original sound signal was generated. The meaning or content contained in the sound signal before execution of the reverse process can not be understood from the sound signal generated by the reverse process.

Next, a "windowing process" to be performed on each frame of a sound signal is described. When frames that are not continuous with each other as a sound are to be interconnected, the windowing process is performed to convert a waveform of a connecting portion, so as to permit a smooth sound transition.

More specifically, the CPU 100 multiplies a sound signal of each frame with a "shaping function", such as a trigonometric function, so as to shape the sound signal in such a manner that the signal smoothly rises at a leading end portion of the frame and smoothly falls at a trailing end portion of the frame. When successive sound signals are divided into a plurality of frames and the frames are interconnected in different order from the order of the original sound signals through acoustic processing, there may be produced click noise in the connecting portions; however such noise can be removed by the windowing process.

Figures 3, 4:
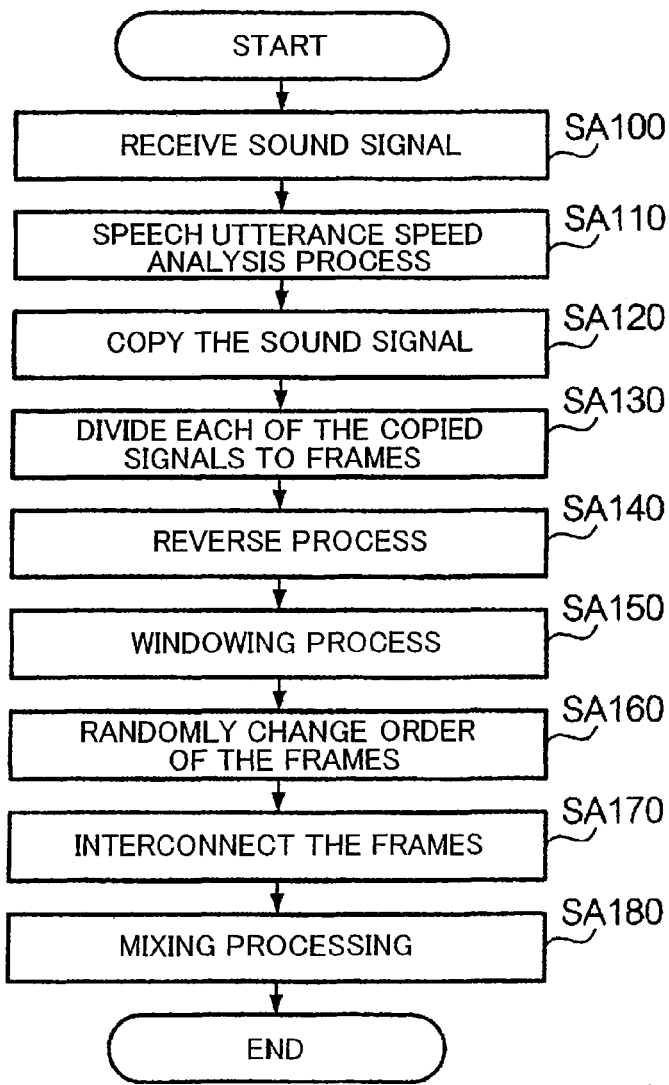
FIG. 3 is a diagram showing an example of a frame length selection table provided in the masking sound generation apparatus.
FIG. 4 is a flow chart showing an example operational sequence of masking sound generation processing performed in the masking sound generation apparatus.

Next, a description will be given about a "frame length selection table" stored in the ROM 210. FIG. 3 is a diagram showing an example of the frame length selection table. In the frame length selection table, various frame length values are associated with various ranges of the aforementioned speech utterance speed. For example, a frame length value "0.10" sec. is associated with a speech utterance speed range of 7.5 or over to below 12.5 (sec.$^{-1}$). Here, a length of one frame is set to be equal to a time length of one syllable when the speech utterance speed is of a middle value in the individual speech utterance speed ranges. Namely, when the speech utterance speed is 10 (sec.$^{-1}$), the utterance speed of one syllable is 0.10 sec., and the frame length corresponding to the speech utterance speed range of 7.5 or over to below 12.5 (sec.$^{-1}$), in which the speech utterance speed of 10 (sec.$^{-1}$) is included, is set to equal the utterance time length (0.10 sec.) of the syllable. Because, when the length of one frame is extremely shorter than one syllable, the syllable is divided into a plurality of frames, so that the divided syllable can be recognized as if it were the original syllable even if sample data of the individual frames are reconfigured by being reproduced in the reverse chronological direction. When the length of one frame is extremely longer than one syllable, on the other hand, individual syllables within one frame may be undesirably recognized just as they are.

B. Behavior:

The following paragraphs describe behavior of the instant embodiment. FIG. 4 is a flow chart showing an example operational sequence of masking sound generation processing performed by the CPU 100, and FIG. 5 is a diagram schematically showing how sound signals are varied by the masking sound generation processing.

The RAM 220 includes a sound signal buffer region capable of storing a given number of received sound signals corresponding to a predetermined time (e.g., two sec.) necessary for performing a predetermined process on the sound signals. Namely, the received sound signals are temporarily written into the RAM 220. The following processing is performed on each of the sound signals that have been written in the sound signal buffer region up to a quantity corresponding to the capacity of the buffer region. Each time a new sound signal has been received, the data currently stored in the sound signal buffer region are sequentially overwritten or updated, in the chronological order (from the oldest data on), with the received new sound signal, so that the CPU performs processing on the new sound signal.

At step SA100, the masking sound generation apparatus 10 receives a sound signal (original sound signal) from the microphone 30 installed in the acoustic space 20A. The received sound signal is converted into a digital sound signal by the sound input section 300 and then temporarily written into the RAM 220.

At next step SA110, the CPU 100 analyzes the speech utterance speed of the new sound signal written into the RAM 220, and it writes the result of the analysis into the RAM 220.

At step SA120, the CPU 100 copies the sound signal, thus written in the RAM 220, into sound signals of three channels and writes these copied sound signals of three channels, generated as a result of the copying, into the RAM 220. In the following description, these sound signals of the three channels will be referred to as "copied sound signal" consisting of sound signal A, sound signal B and sound signal C. Steps SA130 to SA 170 to be described below are performed on these sound signals A-C so that these signals are converted into mutually-different sound signals.

At step SA130, the CPU 100 performs an operation for converting each of the sound signals into frames. Namely, the CPU 100 reads out from the RAM 220 information pertaining to the speech utterance speed of the original sound signal. More specifically, the CPU 100 reads out a speech utterance speed per predetermined time and calculates standard deviations σ, from an average value of the read-out speech utterance speeds, values of the individual read-out speech utterance speeds. Then, the CPU 100 reads out, from the frame length selection table stored in the ROM 210, frame lengths corresponding to the average value, (average value+deviation σ) and (average value−deviation σ). Then, the CPU 100 divides each of the copied sound signals in accordance with the read-out frame length and writes the thus-divided signals (frames) into the RAM 220. In (a)-A, (a)-B and (a)-C of FIG. 5, there are shown the sound signals A, B and C divided in accordance with different frame lengths.

At step SA140, the CPU 100 performs the aforementioned reverse process on each of the sound signal frames written in the RAM 220. Through the reverse process, the respective frames of sound signals A, B and C are converted into sound signals, as shown in (b)-A, (b)-B and (b)-C of FIG. 5, by data of each of the frames being read out in the reverse chronological order, to thereby reconfigure the sound signal so that the time series of the plurality of frames is changed for each of the channels.

At next step SA150, the windowing process is performed on each of the frames. As a result, partial waveforms corresponding to leading and trailing end portions of each of the frames are shaped.

At next step SA160, the CPU 100 randomly rearranges or changes the order of (i.e., relative positions among) the plurality of frames, for each of sound signals A, B and C (see (c) of FIG. 5), to thereby reconfigure the sound signal so that the time series of the plurality of frames is changed for each of the channels.

At next step SA170, the CPU 100 interconnects the sound signals of the frames, having been rearranged or changed in their relative position at step SA 160, to generate a new sound signal (or scrambled sound signal). The operations at steps SA130-SA170 together constitute a scramble process; in other words, steps SA130-SA170 function as a scramble section.

At next step SA180, the CPU 100 performs mixing (addition) processing on sound signals A, B and C, having been processed separately from one another at steps SA130 to SA170 above, to thereby generate a masking sound (see (d) of FIG. 5).

The masking sound generated through the aforementioned processing has the following characteristics. Namely, in the thus-generated masking sound, sound volume level variations contained in the original sound have been averaged. Because, not only the original sound has been divided into short frames and these short frames have been randomly rearranged or changed in their respective relative position, but also the plurality of sound signals having been subjected to such operations have been superposed on one another. Therefore, the generated masking sound is kept at a substantially constant sound volume level, so that instability of the masking effect due to sound volume variations of the original sound signal can be avoided.

Further, with the instant embodiment of the present invention, where the frame length for dividing the sound signal is set appropriately in accordance with the speech utterance speed, phonemes contained in the original sound are appropriately separated, and thus, a high masking effect can be achieved. Furthermore, the original sound has been sufficiently converted into a meaningless sound by virtue of the phoneme separation and reverse process performed within each of the frames, with the result that the instant embodiment can achieve reliable protection of users' (or user's) privacy and security. Furthermore, because the windowing process has been performed on the connecting portions between the frames, the generated masking sound is a smoothly-connected sound signal, which can thus prevent an uncomfortable or unnatural feeling from being given to the users.

C. Modification:

Whereas one preferred embodiment of the present invention has been described, various modifications may be applied to the described embodiment as will be described below, and these modifications may be combined as desired.

(1) The preferred embodiment has been described above in relation to the case where the CPU 100 of the masking sound generation apparatus 10 performs many of the processes characteristic of the present invention. Alternatively, however, separate hardware modules may be provided to perform such processes.

(2) The preferred embodiment has been described above in relation to the case where various processes are performed on sound signals. However, all of the processes need not necessarily be performed; it is only necessary that the sound signals be altered, through a combination of some of the processes, to such an extent that the meaning, as a word, of the sound signals can not be understood.

(3) The above-described preferred embodiment is constructed to generate a masking sound from a sound signal picked up in the acoustic space 20A. In fact, however, the masking sound is audibly produced in the acoustic space 20B, and generally there exits an obstacle, such as a wall, that changes acoustic characteristics of the sound signal, i.e. sound insulating structure. Thus, the CPU 100 may first generate a masking sound in the manner described above in relation to the preferred embodiment and then perform a filtering process, which simulates sound-insulating characteristics of the sound insulating structure, on the generated masking sound, to thereby impart to the masking sound an acoustic effect as when the sound signal has passed through the sound-insulating structure, such as a wall. As a result, the ultimately generated masking sound can become a sound signal simulating noise of the acoustic space 20A that can be overheard by the users in the acoustic space 20B, and thus, a high masking effect is achievable in the acoustic space 20A.

(4) In the forgoing description of the preferred embodiment, one example scheme for analyzing a speech utterance speed (speech rate) has been explained. However, the speech utterance speed analysis scheme employable in the present invention is not limited to the aforementioned example, and any other suitable scheme may be employed as long as it can obtain analysis results similar to the aforementioned.

(5) Further, the present invention has been described above in relation to the case where a single original sound signal is copied into a plurality of sound signals of three channels, separate sound signal processing is performed on these copied sound signals to convert them into different sound signals, and then these different sound signals are mixed together to generate a masking sound signal. In an alternative, however, the sound signals having been subjected to the sound signal processing may be output separately through a plurality of output channels without being mixed together, and then the sound signals may be output via a plurality of speakers in the acoustic space 20 B provided in adjoining relation to each other.

(6) The preferred embodiment has been described above in relation to the case where the microphone 30 is provided in the acoustic space 20A while the speaker 40 is provided in the acoustic space 20B. Alternatively, however, the microphone 30 and speaker 40 may be provided in any one of the acoustic spaces 20A or 20B. For example, where the microphone 30 and speaker 40 are provided in the acoustic space 20A, a masking sound is generated from a conversation of the users present in the acoustic space 20A and the generated masking sound is audibly produced in the same acoustic space 20A, so that both the conversation and the masking sound can be overheard in the acoustic space 20B. Thus, in this case, it is difficult for the users present in the acoustic space 20B to understand the conversation of the users in the acoustic space 20A. Needless to say, in such a case, the microphone 30 and speaker 40 are positioned appropriately and appropriate signal processing is performed so that unwanted hauling can be reliably prevented.

(7) Furthermore, the preferred embodiment has been described above in relation to the case where the microphone 30 and speaker 40 are installed in a plurality of rooms, i.e. acoustic spaces 20A and 20B. Alternatively, however, the microphone 30 and speaker 40 may be provided in the same acoustic space in spaced-apart relation to each other; namely, in this case, arrangements may be made such that, even if users in the acoustic space have a highly confidential conversation, a masking sound is audibly produced through the speaker 40 so as to prevent users near the speaker 40 from hearing the content of the conversation.

(8) Whereas the preferred embodiment has been described above in relation to the case where the microphone 30 is provided in the acoustic space 20A while the speaker 40 is provided in the acoustic space 20B, the microphone 30 and speaker 40 may be installed in each of the microphone 30 and speaker 40. In such a case, it is only necessary that the masking sound generation apparatus 10 include an input section, any of users who want to have a highly confidential conversation in one of the acoustic spaces enter information to that effect via the input section, the masking sound generation apparatus 10 pick up a sound in the one acoustic space via the microphone 30 installed in the one acoustic space and perform control such that a masking sound generated thereby is audibly produced in the other acoustic space.

(9) In the above-described preferred embodiment, the CPU 100 is arranged to copy an input original sound signal into three sound signals of different frame lengths, perform different signal processing on the three copied sound signals and then generate a masking sound by mixing together these copied sound signals. However, the number of the channels of the copied sound signals to be processed may be other than three, such as one, two or more than three; the more the number of the channels, the higher the achievable masking effect.

(10) Furthermore, the preferred embodiment has been described above in relation to the case where standard deviations σ indicative of variations over time are calculated from speech utterance speed data obtained through the speech utterance speed process and where the average value of the speech utterance speeds, (average value+deviation σ) and (average value−deviation σ) are applied to the respective framing processes of the copied sound signals. However, the parameters to be used here are not limited to the average value of the speech utterance speeds and (average values±σ); for example, standard errors may be used in place of the standard deviations σ, or the standard deviations may be replaced with suitable preset values. Further, the maximum or minimum value of the speech utterance speed may be used in place of the average value of the speech utterance speed.

(11) Furthermore, in the frame length selection table employed in the above-described preferred embodiment, three frame lengths may be associated with one speech utterance speed, and the CPU 100 may select a plurality of frame lengths from the average value of the speech utterance speeds.

(12) Furthermore, the preferred embodiment has been described above in relation to the case where the copied sound signals are divided with (i.e., using) frame lengths differing among the signals. Alternatively, however, the copied sound signals may be divided with a same or common frame length. In such a case, it is only necessary for the CPU 100 to calculate the average value of the speech utterance speeds, read out from the frame length selection table a frame length corresponding to the average value and divide each of the copied sound signals with the read-out frame length.

(13) Furthermore, the preferred embodiment has been described above in relation to the case where a plurality of speech utterance speed values, such as an average value, (average value+deviation σ) and (average value−deviation σ), are generated on the basis of a single speech utterance speed and the copied sound signals are divided with frame lengths corresponding to the plurality of speech utterance speed values. Alternatively, however, there may be provided, for example, a table where a plurality of frame lengths are associated with a single frame length, in which case a single frame length may be determined on the basis of a single speech utterance speed and then the copied sound signals may be divided into frames using the plurality of a plurality of frame lengths associated with the single frame length using the table.

(14) Moreover, the preferred embodiment has been described above in relation to the case where, each time a sound picked up in the acoustic area 20A is received, a masking sound is generated on the basis of the received picked-up sound, and then the generated masking sound is audibly produced in the acoustic area 20B. Alternatively, however, a sound signal indicative of the masking sound, generated on the basis of the sound picked up in the acoustic area 20A, may be prestored in the storage section 200 so that the stored masking sound signal can be output when the masking sound is to be audibly produced. For example, in cases where acoustic characteristics of noise occurring in the acoustic area 20A are substantially constant, a sufficient masking effect can be achieved even by audibly producing such a pre-generated masking sound.

This application is based on, and claims priority to, JP PA 2007-75282 filed on 22 Mar. 2007. The disclosure of the priority application, in its entirety, including the drawings, claims, and the specification thereof, is incorporated herein by reference.

What is claimed is:

1. A sound masking system comprising:
a sound pickup section that picks up a sound and generates an original sound signal corresponding to the picked-up sound;
a speech utterance speed signal generation section that generates a speech utterance speed signal, indicative of a speech utterance speed of the picked-up sound, on the basis of the original sound signal generated by said sound pickup section;
a table where the speech utterance speed and a frame length for dividing the sound signal into predetermined time lengths are stored in association with each other;
a readout section that reads out from said table the frame length corresponding to the speech utterance speed signal generated by said speech utterance speed signal generation section; and
a scramble section that copies the original sound signal, generated by said sound pickup section, into sound signals of a plurality of channels, divides the original sound signal of each of the channels into a plurality of frames on the basis of the frame length read out by said readout section, reconfigures the sound signal of each of the channels so as to change a time series of the plurality of frames of the channel and then outputs the reconfigured sound signal of each of the plurality of channels as a scrambled sound signal.

2. The sound masking system as claimed in claim 1 wherein said scramble section generates dividing frame lengths corresponding to the plurality of channels, on the basis of the frame length read out by said readout section, such that the divided frames differ in length between the sound signals of the plurality of channels, and said scramble section divides the original sound signal of each of the channels using the generated dividing frame length.

3. The sound masking system as claimed in claim 1 wherein said table stores therein frame lengths, corresponding to individual ones of the channels, in association with one speech utterance speed, and wherein said scramble section divides the original sound signal of each of the channels into frames on the basis of the frame length, corresponding to the channel, read out by said readout section.

4. The sound masking system as claimed in claim 1 which further comprises a processing section that processes the speech utterance signal, generated by said speech utterance speed signal generation section, to generate a plurality of speech utterance speed signals, and wherein said readout section reads out from said table frame lengths corresponding to the plurality of speech utterance speed signals generated by said processing section, and said scramble section divides the original sound signal of each of the channels into frames using the frame length, corresponding to the channel, read out by said readout section.

5. The sound masking system as claimed in claim 1 wherein said scramble section replaces each of the plurality of frames, generated as a result of the original sound signal being divided, with a sound signal generated by reading out sample data of the frame in reverse chronological order, to thereby reconfigure the sound signal so that the time series of the plurality of frames is changed for each of the channels.

6. The sound masking system as claimed in claim 1 wherein, for the original sound signal of each of the channels, said scramble section rearranges the plurality of frames, generated as a result of the original sound signal being divided, into order different from order of the frames in the original sound signal, to thereby reconfigure the sound signal so that the time series of the plurality of frames is changed for each of the channels.

7. The sound masking system as claimed in claim 1 which further comprises a waveform processing section that processes waveforms of leading and trailing end portions of the plurality of frames divided from the original sound signal.

8. A sound masking system comprising:
a sound pickup section that picks up a sound and generates an original sound signal corresponding to the picked-up sound;
a speech utterance speed signal generation section that generates a speech utterance speed signal, indicative of a speech utterance speed of the picked-up sound, on the basis of the original sound signal generated by said sound pickup section;
a table where the speech utterance speed and a frame length for dividing the sound signal into predetermined time lengths are stored in association with each other;
a readout section that reads out from said table a frame length corresponding to the speech utterance speed signal generated by said speech utterance speed signal generation section; and
a scramble section that divides the original sound signal, generated by said sound pickup section, into a plurality of frames on the basis of the frame length read out by said readout section, replaces each of the divided frames with a sound signal generated by reading out sample data of the frame in reverse chronological order, generates a reconfigured sound signal by reconfiguring the replaced frames so as to change a time series of the frames and then outputs the reconfigured sound signal as a scrambled sound signal.

9. The sound masking system as claimed in claim 8 which further comprises a waveform processing section that processes waveforms of leading and trailing end portions of the plurality of frames divided from the original sound signal.

10. A masking sound generation method comprising:
a generation step of picking up a sound and generating an original sound signal corresponding to the picked-up sound;

a step of generating a speech utterance speed signal, indicative of a speech utterance speed of the picked-up sound, on the basis of the original sound signal generated by said generation step;
a readout step of reading out a frame length, corresponding to the generated speech utterance speed signal, from a table where the speech utterance speed and the frame length for dividing the sound signal into predetermined time lengths are stored in association with each other;
a step of copying the generated sound signal into sound signals of a plurality of channels, dividing the sound signal of each of the channels into a plurality of frames on the basis of the frame length read out by said readout step, reconfiguring the sound signal of each of the channels so as to change a time series of the plurality of frames of the channel and then outputting the reconfigured sound signal of each of the channels as a scrambled sound signal.

11. A non-transitory computer-readable storage medium containing a program for causing a computer to perform a masking sound generation procedure, said masking sound generation procedure comprising:
a generation step of picking up a sound and generating an original sound signal corresponding to the picked-up sound;
a step of generating a speech utterance speed signal, indicative of a speech utterance speed of the picked-up sound, on the basis of the original sound signal generated by said generation step;
a readout step of reading out a frame length, corresponding to the generated speech utterance speed signal, from a table where the speech utterance speed and the frame length for dividing the sound signal into predetermined time lengths are stored in association with each other;
a step of copying the generated sound signal into sound signals of a plurality of channels, dividing the sound signal of each of the channels into a plurality of frames on the basis of the frame length read out by said readout step, reconfiguring the sound signal of each of the channels so as to change a time series of the plurality of frames of the channel and then outputting the reconfigured sound signal of each of the channels as a scrambled sound signal.

12. A masking sound generation method comprising:
a generation step of picking up a sound and generating an original sound signal corresponding to the picked-up sound;
a step of generating a speech utterance speed signal, indicative of a speech utterance speed of the picked-up sound, on the basis of the original sound signal generated by said generation step;
a readout step of reading out a frame length, corresponding to the generated speech utterance speed signal, from a table where the speech utterance speed and the frame length for dividing the sound signal into predetermined time lengths are stored in association with each other; and
a step of dividing the sound signal, generated by said generation step, into a plurality of frames on the basis of the frame length read out by said readout step, replacing each of the divided frames with a sound signal generated by reading out sample data of the frame in reverse chronological order, generating a reconfigured sound signal by reconfiguring the replaced frames so as to change a time series of the frames and then outputting the reconfigured sound signals as a scrambled sound signal.

* * * * *